(12) United States Patent
Randrianasolo et al.

(10) Patent No.: US 10,172,171 B2
(45) Date of Patent: Jan. 1, 2019

(54) SYSTEM FOR CONNECTING A MOBILE DEVICE TO A WIRELESS NETWORK OF AN AIRCRAFT

(71) Applicant: Airbus Operations (S.A.S.), Toulouse (FR)

(72) Inventors: Ndrianina Randrianasolo, Tournefeuille (FR); Jean-michel Vadot, Colomiers (FR); Mathias Michalski, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 216 days.

(21) Appl. No.: 14/701,196

(22) Filed: Apr. 30, 2015

(65) Prior Publication Data
US 2015/0327307 A1 Nov. 12, 2015

(30) Foreign Application Priority Data
May 7, 2014 (FR) ...................................... 14 54144

(51) Int. Cl.
*H04B 5/00* (2006.01)
*H04W 76/11* (2018.01)
(Continued)

(52) U.S. Cl.
CPC .......... *H04W 76/11* (2018.02); *H04B 5/0025* (2013.01); *H04L 63/0492* (2013.01);
(Continued)

(58) Field of Classification Search
CPC ... H04N 21/214; H04W 4/008; H04B 5/0025; H04M 15/93; H04L 63/0492; G01P 13/025; G01C 23/005
See application file for complete search history.

(56) References Cited

U.S. PATENT DOCUMENTS

| | | | |
|---|---|---|---|
| 8,495,722 B1 | 7/2013 | McCusker | |
| 2003/0055975 A1* | 3/2003 | Nelson | H04B 7/18506 709/227 |

(Continued)

FOREIGN PATENT DOCUMENTS

| | | |
|---|---|---|
| EP | 2 657 878 | 10/2013 |
| WO | WO 2014/031328 | 2/2014 |

OTHER PUBLICATIONS

Preliminary Search Report for French Application No. 1454144 dated Jan. 7, 2015.

(Continued)

*Primary Examiner* — Salvador E Rivas
(74) *Attorney, Agent, or Firm* — Jenkins, Wilson, Taylor & Hunt, P.A.

(57) ABSTRACT

A system and method for connecting a mobile device to a wireless network of an aircraft, for automating and securing the connection of a mobile device to a wireless network of an aircraft. A connection system includes: a management module installed in a secured area of the aircraft and linked to an access point of the wireless network, the management module being configured to generate connection parameters and to configure the access point according to the connection parameters; and a wireless transmission module installed in the secured area and linked to the management module, the transmission module being configured to deliver the connection parameters to the mobile device according to a range restricted to the secured area, the connection parameters being adapted to allow the mobile device to be connected by a simple scan and securely to the wireless network of the aircraft via the access point.

10 Claims, 3 Drawing Sheets

(51) Int. Cl.

| | | |
|---|---|---|
| *H04M 15/00* | (2006.01) | |
| *H04L 29/06* | (2006.01) | |
| *H04W 12/04* | (2009.01) | |
| *H04W 88/08* | (2009.01) | |
| *H04W 4/80* | (2018.01) | |
| *G01P 13/02* | (2006.01) | |
| *G01C 23/00* | (2006.01) | |
| *H04W 12/06* | (2009.01) | |
| *H04W 84/12* | (2009.01) | |
| *B64D 45/00* | (2006.01) | |
| *H04L 29/08* | (2006.01) | |

(52) U.S. Cl.
CPC ........... *H04M 15/93* (2013.01); *H04W 12/04* (2013.01); *B64D 2045/0075* (2013.01); *G01C 23/005* (2013.01); *G01P 13/025* (2013.01); *H04L 67/12* (2013.01); *H04W 4/80* (2018.02); *H04W 12/06* (2013.01); *H04W 84/12* (2013.01); *H04W 88/08* (2013.01)

(56) References Cited

U.S. PATENT DOCUMENTS

| | | | |
|---|---|---|---|
| 2005/0220055 A1* | 10/2005 | Nelson | H04B 7/18506 370/331 |
| 2006/0251256 A1 | 11/2006 | Asokan et al. | |
| 2006/0252422 A1* | 11/2006 | Kauffman | B64D 45/0015 455/431 |
| 2010/0078475 A1* | 4/2010 | Lin | B64F 1/366 235/380 |
| 2011/0295501 A1* | 12/2011 | Gutierez-Castaneda | G05D 1/0005 701/528 |
| 2011/0320612 A1* | 12/2011 | Oka | H04W 4/008 709/227 |
| 2014/0065954 A1* | 3/2014 | Ovens | G08G 5/0021 455/41.1 |
| 2014/0226819 A1* | 8/2014 | Dittrich | G06F 21/36 380/270 |

OTHER PUBLICATIONS

Dassault Falcon: "EFB Falcon", EFB Briefing, No. Rev. 2, 2010, pp. 1-59, XP007919263, pp. 9, 10 and pp. 18, 19.

"EFB Falcon: Introduction to CMA 1100," Dassault Falcon, EFB Briefing, Ed. Rev. 2, pp. 1-59, XP007919263, pp. 9-10,18-19 (2010).

\* cited by examiner

SYSTEM FOR CONNECTING A MOBILE DEVICE TO A WIRELESS NETWORK OF AN AIRCRAFT

CROSS-REFERENCE TO RELATED APPLICATION

This application claims the benefit of and priority to French patent application No. 14 54144 filed on May 7, 2014, the entire disclosure of which is incorporated by reference herein.

BACKGROUND

The present disclosure relates to the field of communication over a wireless network of an aircraft. In particular, the disclosure herein relates to a method and a system for automatically and securely connecting a mobile device to a wireless network of an aircraft.

Mobile electronic devices are increasingly being used in aircraft. As an example, the paper-based manuals and navigation maps that the pilot brings with him into the cockpit are currently replaced by an electronic flight bag (EFB) in the form of a tablet or portable computer that is much less heavy and more effective for the management of the flight than the paper documents. Furthermore, a maintenance operative may also need to connect a portable computer to the network of the aircraft to know the alerts or anomalies detected in the aircraft.

Thus, it is practical to use a wireless network of Wi-Fi type to allow an EFB, a tablet or a portable computer to be connected to the network of the aircraft. For example, it is advantageous for the maintenance operative to be connected to the network of the aircraft while moving about in or around the aircraft to perform maintenance operations.

Connecting to a wireless network usually requires authentication parameters (for example passwords, keys or certificates). The management of these parameters for an entire fleet of aircraft and of mobile devices is very complex, costly and involves a very heavy workload. In effect, it is not simple to manage the configuration of the various networks of the aircraft as well as the creation and the deployment of the authentication parameters on a multitude of mobile devices intended to be connected to the various wireless networks. Furthermore, it is necessary to manage the synchronization of the configuration of the mobile devices with respect to that of the networks of the various airplanes of the airline.

Furthermore, it is essential to provide a rapid organizational reaction to any security threat regarding the networks of the aircraft. In effect, in the case where a hacker accesses a password or a certificate by stealing, for example, an EFB, it is important to be highly reactive to reupdate the configuration of all the wireless networks of the aircraft concerned as well as all the EFBs that connect to the networks. Obviously, it is essential to be already aware that the EFB has been stolen or compromised.

Regarding the user, it is important to correctly verify that he or she is connected to the correct wireless network, for example that of the cockpit of the airplane, and not to that of the cabin or to the wireless network of a neighboring airplane or even to that of the airport. For this, the user may be required to know which is the correct wireless network and to manually select it, which for him or her represents an additional task.

More particularly, two eventualities may arise. According to a first case, the wireless network is already configured but the user is still connected to another network and, according to a second case, the wireless network is not at all configured. In the first case, the Wi-Fi parameters must be consulted to find the correct network in order to connect thereto. In the second case, it is in addition necessary to configure it by re-entering the parameters by hand, bearing in mind that the manual input of a long passphrase (i.e. a password having a large number of characters) can be very tedious.

An object of the present disclosure is consequently to propose a connection method and system that remedy the abovementioned drawbacks, in particular by automating the management of the connection parameters while increasing the security of the connection between a mobile device and a wireless network of an aircraft.

SUMMARY

The present disclosure aims to automate and secure the connection of a mobile device to a wireless network of an aircraft comprising an access point, and relates to a connection system comprising:
- a management module installed in a secured area of the aircraft and linked to the access point, the management module being configured to generate connection parameters and to configure the access point according to the connection parameters, and
- a wireless transmission module installed in the secured area and linked to the management module, the transmission module being configured to deliver the connection parameters to the mobile device according to a range restricted to the secured area, the connection parameters being adapted to allow the mobile device to be connected by a simple scan and securely to the wireless network of the aircraft via the access point.

This system allows for an autonomous organizational management of security parameters and, in particular, an automatic and secure updating of the connection and configuration parameters of the access point, while reducing the human actions to the strict minimum.

BRIEF DESCRIPTION OF THE DRAWINGS

Other particular features and advantages of the system and of the method according to the disclosure herein will become more apparent on reading the description given below, by way of indication but in a nonlimiting manner, with reference to the attached drawings in which.

DETAILED DESCRIPTION

The principle of the disclosure herein comprises using a secured area to automatically manage and deliver connection parameters within the secured area allowing a mobile device to be then connected to a wireless access point in total security. A secured area should be understood to mean an area to which access is limited to authorized and trusted people and to users of the wireless network concerned.

Figure 1:
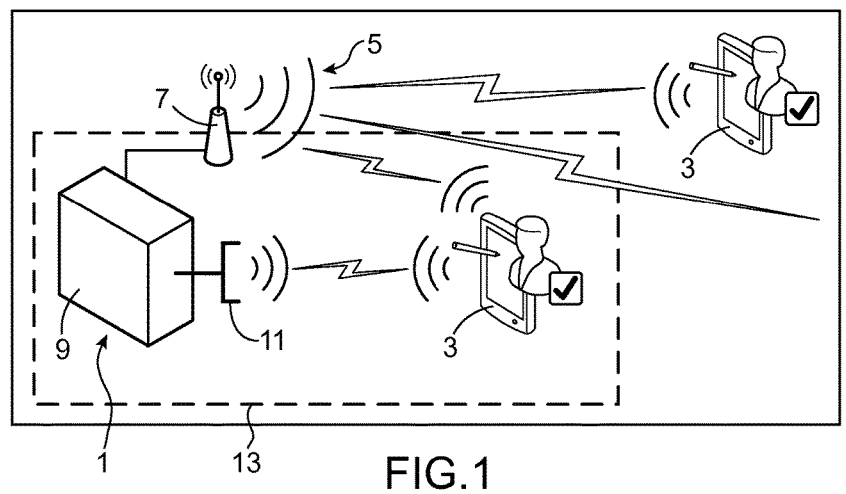
FIG. 1 schematically illustrates a system for automatically and securely connecting a mobile device to a wireless network of an aircraft, according to an embodiment of the disclosure herein.

FIG. 1 schematically illustrates a system 1 for automatically and securely connecting a mobile device 3 to a wireless network 5 of an aircraft, according to an embodiment of the disclosure herein. This figure is also an illustration of a method for connecting a mobile device to a wireless network of an aircraft, according to an embodiment of the disclosure herein.

The wireless network 5 is, for example, a Wi-Fi network comprising at least one wireless access point 7. As an example, the Wi-Fi network is implemented according to the WPA-PSK (or WPA2) technology offering very good security by using a passphrase (or secret phrase, that is to say a password made up of a large number of characters) of PSK (pre-shared key) type, shared for example by all the users. According to another example, the Wi-Fi network is implemented according to the WPA-EAP technology with EAP-TLS which offers excellent security by using a private key and certificates. Thus, a mobile device provided with suitable connection parameters (certificate, key or passphrase) can be connected to the wireless network 5 via the access point 7.

According to the disclosure herein, the connection system 1 comprises a management module 9 and a wireless transmission module 11 both installed in a secured area 13 of the aircraft. By way of example, the secured area 13 can be a cockpit, an avionics bay, a load bay, a landing gear bay or a crew rest area which is obviously accessible only to authorized and trusted users. According to another example, the secured area 13 can be the cabin of the aircraft in the specific case where the Wi-Fi network is intended only for passengers of the aircraft because only authorized and trusted people as well as the passengers have access thereto.

The management module 9 is linked by wired structure to the wireless access point 7 and to the wireless transmission module 11. Advantageously, the wireless access point 7 is also installed in the secured area 13. Optionally, other access points may also be installed in other areas of the aircraft.

The management module 9 is configured to generate connection parameters and to accordingly configure the access point or points 7 according to the connection parameters generated. It will be noted that the connection parameters comprise security accreditations in the form of certificates, keys or passphrases according to the standard used for the wireless network 5 and, advantageously, these parameters are valid for a limited and predetermined time, and therefore regularly renewed. A number of connection parameters may be valid at the same time to connect to the access point 7.

Furthermore, the management module 9 is configured to transmit the connection parameters via the wired connection to the wireless transmission module 11. The latter is a module of high reliability installed only in the secured area 13 and has a range restricted to this area. The wireless transmission module 11 is configured to deliver the connection parameters received from the management module 9 to a mobile device 3 located in the secured area 13. Thus, no broadcasting of the connection parameters is possible outside of the secured area 13. In practice, the delivery of the connection parameters is performed either only over a range of barely a few centimeters, or over a range of several meters in a precise direction.

Moreover, the connection parameters are adapted to allow the mobile device 3 which has received these parameters to connect, for example, by a simple scan and securely to the wireless network of the aircraft via the wireless access point 7. Obviously, once the mobile device 3 is connected to the wireless network 5 of the aircraft, this device 3 can be moved about in total security in other areas of the aircraft which are not necessarily secured. In effect, the proven connection of the mobile device to the wireless network of the aircraft via the access point is ensured over a predetermined area that can cover the aircraft. This predetermined area covers at least the secured area and can cover, depending on the case, an extent of a diameter substantially greater than or equal to the length of the aircraft or to the two most remote ends of the aircraft.

Figure 2:
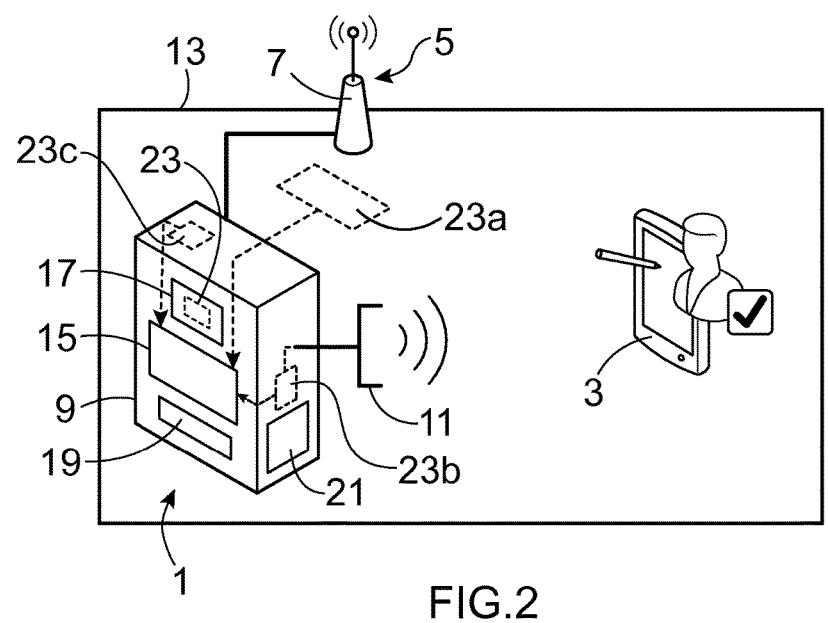
FIG. 2 schematically illustrates a connection system, according to a preferred embodiment of the disclosure herein.

FIG. 2 schematically illustrates a connection system, according to a preferred embodiment of the disclosure herein.

According to this embodiment, the management module 9 comprises a parameterizing unit 15, a configuration file unit 17, a pseudo-random number generator 19, and an identification generator 21. These units and generators are for example implemented by logic structure/hardware/software or applications incorporated in the management module 9. The latter is, for example, a computer usually comprising input and output peripheral devices, a processing unit, and a memory that can comprise a computer program comprising code instructions suitable for implementing the connection method according to the disclosure herein.

The parameterizing unit 15 is adapted to receive a predefined trigger event intended to trigger the process of creation of the connection parameters. More particularly, the parameterizing unit 15 is configured to stand by for the trigger event and, once the latter is received, the parameterizing unit 15 is configured to proceed to produce the connection parameters.

Advantageously, the trigger event 23 is configurable and can be previously programmed in the configuration file unit 17. In effect, the configuration file unit 17 makes it possible to define this trigger event out of a set of events that may include external events 23a such as, for example, events deriving from avionics parameters (typically a change of flight phase received for example via an ARINC 834 interface) or a predetermined date as well as other types of events such as, for example, a request 23b from a mobile device, from a user via an application or a reset 23c.

Furthermore, the configuration file unit 17 is intended to define the nature and the properties of the connection parameters to be produced and the method for transmitting these parameters to the wireless transmission module 11 and to the access point 7.

Moreover, the pseudo-random number generator 19 is configured to generate a random series of digits. The latter is used by the parameterizing unit 15 to produce the connection parameters and to configure the access point or points 7.

The configuration parameters are directly sent by the parameterizing unit 15 to the wireless access point 7. On the other hand, before the connection parameters are transmitted to the wireless transmission module 11, they are first formatted by the identification generator 21. In effect, the latter is configured to translate the connection parameters into a language adapted to or compatible with the transmission mode of the wireless transmission module 11.

Figure 3A:
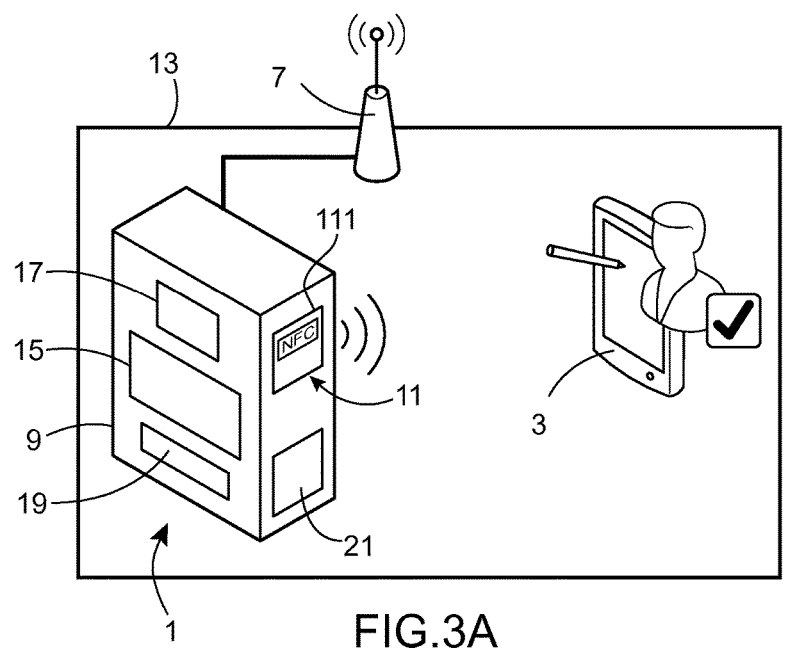
FIGS. 3A and 3B schematically illustrate a connection system, according to first and second embodiments of the disclosure herein.

FIG. 3A schematically illustrates a connection system, according to a first embodiment of the disclosure herein.

According to this first embodiment, the wireless transmission module 11 comprises a near field communication interface of NFC type 111. In this case, the identification generator 21 is configured to adapt the connection parameters to the NFC communication technique before transmitting them to the wireless transmission module 11.

Thus, a mobile device 3 (comprising wireless connection structure/hardware/software, structure/hardware/software for recovering the connection parameters, configuration hardware/software and an NFC interface) can easily connect to the wireless transmission module 11 in order to recover the connection parameters. These parameters will automatically configure the mobile device 3 for it to be able to connect to the wireless network 5 of the aircraft.

Figure 3B:
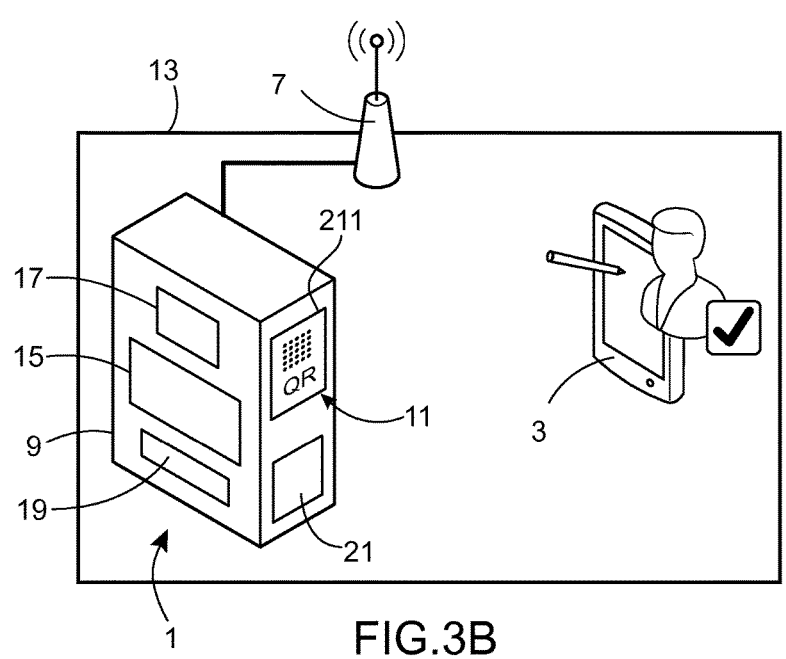

FIG. 3B schematically illustrates a connection system, according to a second embodiment of the disclosure herein.

According to this second embodiment, the wireless transmission module 11 comprises a screen 211 and, in this case, the identification generator 21 is configured to translate the connection parameters into a QR matrix code before transmitting them to the wireless transmission module 11. The latter displays the QR code on its screen 211 pending being read by a mobile device 3. Obviously, it will be noted that the screen 211 displaying the QR code is not visible outside of the secured area 13.

Thus, a mobile device 3 comprising a QR code reader (for example a camera) in addition to the connection, recovery and configuration structure/hardware/software, can scan the connection parameters from the screen 211 of the wireless transmission module 11.

As a variant, the wireless transmission module 11 can comprise a printer intended to print the QR code on paper, the user then being able to scan the connection parameters by his or her mobile device 3.

Figure 4:
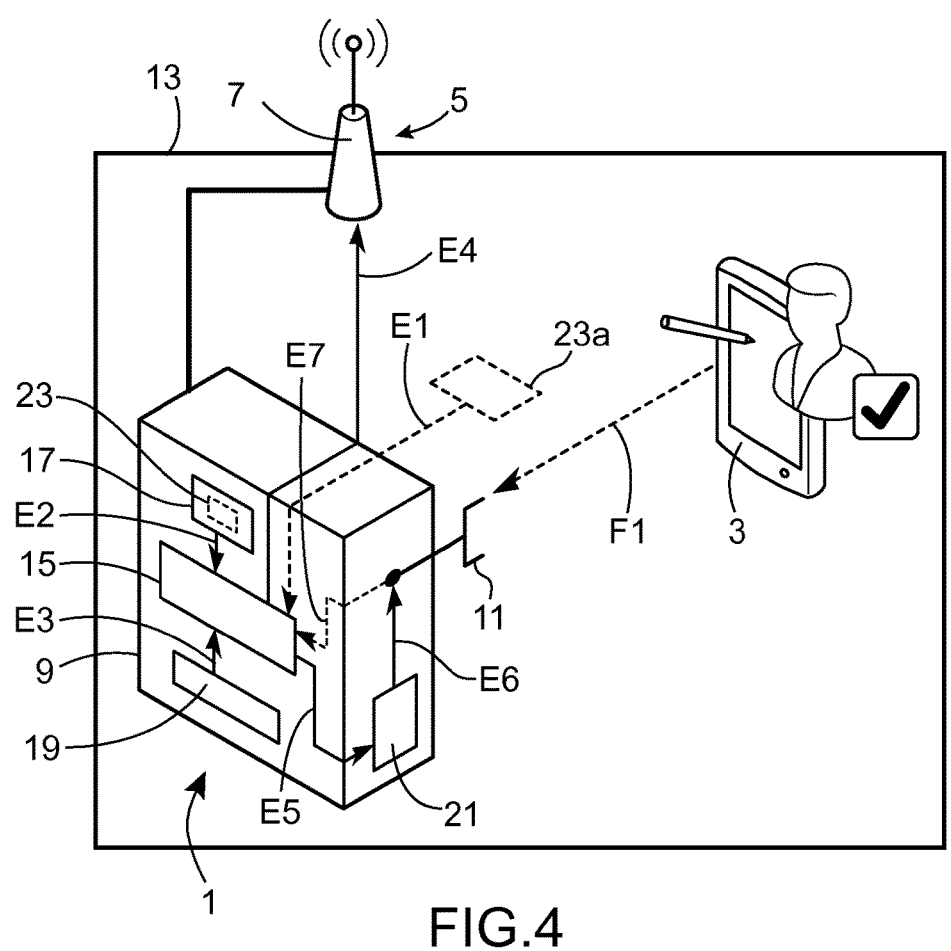
FIG. 4 schematically illustrates the steps of a connection method, according to an embodiment of the disclosure herein.

FIG. 4 schematically illustrates steps of a connection method, according to an embodiment of the disclosure herein.

In the initial step, the management module 9 is in a state of listening for predetermined environmental events or signals.

When the parameterizing unit 15 receives a trigger event (for example an external signal represented by the arrow E1), it then checks with the configuration file unit 17 (arrow E2) whether this signal corresponds to a predefined trigger event 23. If this is not the case, the parameterizing unit 15 remains listening for other signals, otherwise (i.e., if the signal received corresponds to the expected trigger event), it calls (arrow E3) the pseudo-random number generator 19 which will return to it a random series of digits. The parameterizing unit 15 uses this random series of digits to generate connection parameters (name of the wireless network, passphrase, certificate, key, etc.).

By way of example, for a long-haul airplane, the trigger event programmed in the configuration file unit 17 may be the pre-flight phase of the airplane. Thus, new connection parameters are generated on each flight. On the other hand, for a small or medium range airplane, the trigger event is, for example, a precise time or date. Thus, new connection parameters are generated for example every 12 or 24 hours, which avoids the pilot having to reconnect before each take-off when he or she is still in command of the same airplane for a next flight. According to another example, the trigger event may correspond to a request originating from a mobile device of a maintenance operative. According to yet another example, the trigger event corresponds to a reset of the management module by, for example, a reset button. The reset button can be a physical button or a software button in a parameter reset application. This makes it possible to generate new connection parameters as soon as a hacking (or a theft) of a mobile device 3 is observed.

Moreover, once the connection parameters are generated, the parameterizing unit 15 transmits (arrow E4) these parameters to authentication hardware/software of the wireless network 5 to configure the access point 7. Thus, the access point can recognize the new connection parameters.

Similarly, the parameterizing unit 15 transmits (arrow E5) the connection parameters to the identification generator 21 in order for the latter to translate these parameters into a language compatible with the transmission mode of the wireless transmission module 11.

Next, the identification generator 21 transmits (arrow E6) the connection parameters to the wireless transmission module 11 according to a language suited, for example, to an NFC communication technique or QR code. These connection parameters remain in the wireless transmission module 11 pending a request from a user provided with a mobile device 3 to be connected to the wireless network.

In the case where the wireless transmission module 11 comprises an NFC interface 25, it is sufficient for the user to bring (dotted arrow F1) the mobile device 3 close to the wireless transmission module 11 in order to scan the connection parameters. If the NFC is on the physical medium of the mobile device 3, the scan will happen naturally and automatically.

It will be noted that, in the case of a connection according to the NFC technology, the wireless transmission module 11 may send (dotted arrow E7) a signal to the parameterizing unit 15 each time a mobile device 3 reads the connection parameters. If necessary, this allows the parameterizing unit 15 to generate new connection parameters for each mobile device 3 in order to clearly identify and differentiate the various mobile devices.

In the case where the wireless transmission module 11 comprises a screen 211 displaying a QR code, the user must position (dotted arrow F1) the camera of the mobile device 3 in such a way as to see the screen 211 thereon in order to scan the connection parameters.

Thus, the connection system according to the disclosure herein allows for an automated, secured and autonomous organizational management of the connection parameters. In effect, it is sufficient to configure the connection system just once on installation and then the reconfiguration of the access point and of the mobile devices is fully automated. Furthermore, the user no longer has to manually reenter the connection parameters, simply has to do a scan. Furthermore, the scan via a wireless technology in the secured area makes it possible to automatically connect to the correct wireless network.

Moreover, in the case of the security parameters being compromised, the risk is limited to the validity time of these parameters which can correspond to a single flight or a day depending on the configuration and on a single given aircraft. Furthermore, having discovered the compromise, a simple press on a reset button makes it possible to modify the configurations.

The invention claimed is:

1. A system for connecting a mobile device to a wireless network of an aircraft, the network comprising a wireless access point, the system comprising:
   a management module installed in a secured area of the aircraft and linked to the wireless access point, the management module being configured to generate connection parameters and to configure the wireless access point according to the connection parameters, the management module further comprising a parameterizing unit configured to receive a predefined trigger event and to produce the connection parameters on reception of the trigger event, wherein the trigger event is a change of flight phase, such that the parameterizing unit is configured to produce new connection parameters for the wireless access point in response to the change of flight phase, and wherein the parameterizing unit is programmed to detect the trigger event by detecting a signal from an avionics interface that the airplane is entering a pre-flight phase, such that new connection parameters are generated on each flight, and a wireless transmission module installed in the secured area and linked to the management module, the wireless transmission module being configured to deliver the connection parameters to the mobile device according to a range restricted to the secured area, the connection parameters being generated by the management module to allow the mobile device to be connected securely to the wireless network of the aircraft via the wireless access point;

wherein the wireless transmission module comprises a wireless transmission module near field communication (NFC) interface in the secured area, wherein the wireless transmission module is configured to deliver the connection parameters for the wireless access point to a mobile device NFC interface of the mobile device in the secured area using the wireless transmission module NFC interface.

2. The system as claimed in claim 1, wherein the management module comprises a configuration file unit intended to define the trigger event, properties of the connection parameters and a transmitter for transmitting the connection parameters to the wireless transmission module and to the access point.

3. The system as claimed in claim 1, wherein the management module comprises a pseudo-random number generator configured to generate a random series of digits, the parameterizing unit being configured to produce the connection parameters by using the random series of digits.

4. The system as claimed in claim 1, wherein the management module comprises an identification generator configured to translate the connection parameters into a language compatible with the transmission mode of the wireless transmission module.

5. The system as claimed in claim 4, wherein the identification generator is configured to translate the connection parameters to the NFC interface.

6. The system as claimed in claim 4, wherein the identification generator is configured to translate the connection parameters into a QR matrix code.

7. The system as claimed in claim 1, wherein the secured area where the connection parameters are delivered to the mobile device is a cockpit, an avionics bay, a load bay, a landing gear bay, a crew rest area, or a passenger cabin.

8. The system as claimed in claim 1, which comprises the mobile device, the mobile device comprising wireless connection structure and structure for recovering the connection parameters for the wireless access point.

9. An aircraft comprising a system as claimed in claim 1.

10. A method for connecting a mobile device to a wireless network of an aircraft, the network comprising a wireless access point, the method comprising:

generating connection parameters in a secured area of the aircraft, following the reception of a predefined trigger event, wherein the trigger event is a change of flight phase, and generating connection parameters includes producing new connection parameters for the wireless access point in response to the change of flight phase, and wherein generating connection parameters comprises detecting the trigger event by detecting a signal from an avionics interface that the airplane is entering a pre-flight phase, such that new connection parameters are generated on each flight;

configuring the wireless access point according to the connection parameters; and delivering, by a wireless transmission module comprising a wireless transmission module near field communication (NFC) interface in the secured area, the connection parameters for the wireless access point to a mobile device NFC interface of the mobile device within the secured area using the mobile device NFC interface, the connection parameters being generated to allow the mobile device to be connected securely to the wireless network of the aircraft via the wireless access point.

\* \* \* \* \*